United States Patent
Shioi et al.

(10) Patent No.: US 7,715,618 B2
(45) Date of Patent: May 11, 2010

(54) IMAGE FILE CREATING APPARATUS AND IMAGE FILE REPRODUCING APPARATUS

(75) Inventors: Masahiro Shioi, Chiba (JP); Toshio Nomura, Hachioji (JP); Keiji Horiuchi, Gifu (JP); Takatoshi Yoshikawa, Ogaki (JP); Hidehiko Sekizawa, Tokyo (JP); Seiji Satoh, Tokyo (JP)

(73) Assignees: Sharp Kabushiki Kaisha, Osaka (JP); Sanyo Electric Co, Ltd., Osaka (JP); Sony Corporation, Tokyo (JP)

( * ) Notice: Subject to any disclaimer, the term of this patent is extended or adjusted under 35 U.S.C. 154(b) by 536 days.

(21) Appl. No.: 10/553,350

(22) PCT Filed: Apr. 19, 2004

(86) PCT No.: PCT/JP2004/005537

§ 371 (c)(1),
(2), (4) Date: Oct. 30, 2006

(87) PCT Pub. No.: WO2004/093468

PCT Pub. Date: Oct. 28, 2004

(65) Prior Publication Data

US 2007/0171277 A1      Jul. 26, 2007

(30) Foreign Application Priority Data

Apr. 17, 2003   (JP) ............................. 2003-112851

(51) Int. Cl.
G06K 9/00 (2006.01)
(52) U.S. Cl. ..................................... 382/154
(58) Field of Classification Search ........................ None
See application file for complete search history.

(56) References Cited

U.S. PATENT DOCUMENTS 5,315,377 A    5/1994   Isono et al.

(Continued)

FOREIGN PATENT DOCUMENTS

JP          5-30538 A       2/1993

(Continued)

OTHER PUBLICATIONS

Siragusa et al., "General Purpose Stereoscopic Data Descriptor," VRex, Inc., Jun. 5, 2000, XP-002477340, pp. 1-6.

Primary Examiner—Vikkram Bali
Assistant Examiner—Elisa M Rice
(74) Attorney, Agent, or Firm—Birch, Stewart, Kolasch & Birch, LLP

(57) ABSTRACT

A controller (101) designates the method of integrating viewpoint images. An image integrator (102) creates an integrated image by placing individual viewpoint images in appropriate positions. A 3D image control information creator (103) creates 3D image control information by formatting the placement mode of individual viewpoint images and various 3-dimensional image characteristics. An encoder (104) encodes integrated image data. A multiplexer (105) multiplexes the coded data and the 3D image control information and outputs them. A filename deciding unit (106) decides the name of a file when multiplexed data is recorded as a file. A storage directory deciding unit (107) decides the directory in which a file to be recorded is stored. A file creator (108) records a file with the decided filename under the decided storage directory. Thus, the distinction between 3-dimensional display image data and 2-dimensional image data can be clarified.

2 Claims, 13 Drawing Sheets

U.S. PATENT DOCUMENTS

| | | | |
|---|---|---|---|
| 6,023,277 | A | 2/2000 | Osaka et al. |
| 6,084,978 | A * | 7/2000 | Taylor et al. ............ 382/154 |
| 6,507,358 | B1 | 1/2003 | Mori et al. |
| 6,573,819 | B1 | 6/2003 | Oshima et al. |
| 2002/0030675 | A1 | 3/2002 | Kawai |
| 2002/0054207 | A1 | 5/2002 | Iizuka et al. |
| 2002/0071616 | A1 | 6/2002 | Yoshida |
| 2002/0122585 | A1* | 9/2002 | Swift et al. ............ 382/154 |
| 2003/0048354 | A1 | 3/2003 | Takemoto et al. |
| 2003/0128273 | A1 | 7/2003 | Matsui et al. |

FOREIGN PATENT DOCUMENTS

| | | |
|---|---|---|
| JP | 5-122733 A | 5/1993 |
| JP | 8-317425 A | 11/1996 |
| JP | 10-74267 | 3/1998 |
| JP | 10-336705 A | 12/1998 |
| JP | 11-041627 A | 2/1999 |
| JP | 11-127369 A | 5/1999 |
| JP | 11-191895 A | 7/1999 |
| JP | 2000-197074 A | 7/2000 |
| JP | 2000-201308 A | 7/2000 |
| JP | 2001-197521 A | 7/2001 |
| JP | 2002-77943 | 3/2002 |
| JP | 2002-095014 A | 3/2002 |
| JP | 2002-095018 A | 3/2002 |
| JP | 2003-111101 A | 4/2003 |

* cited by examiner

FIG. 13
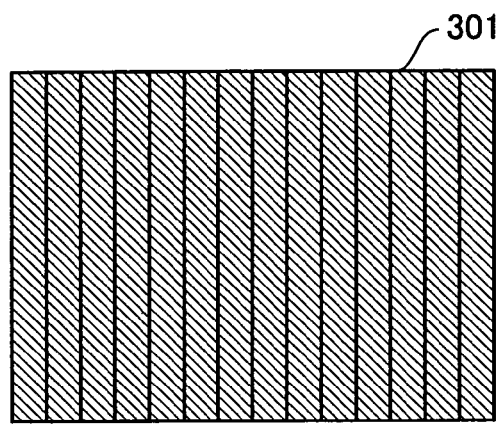
(a)
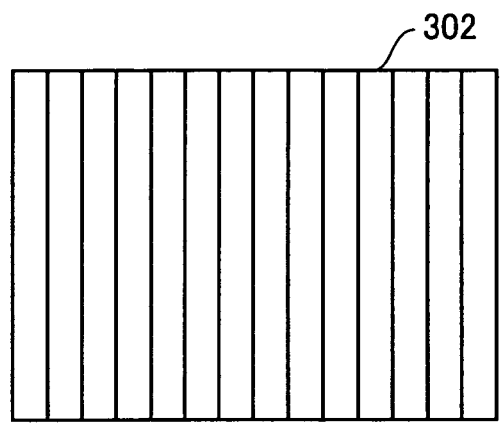
(b)
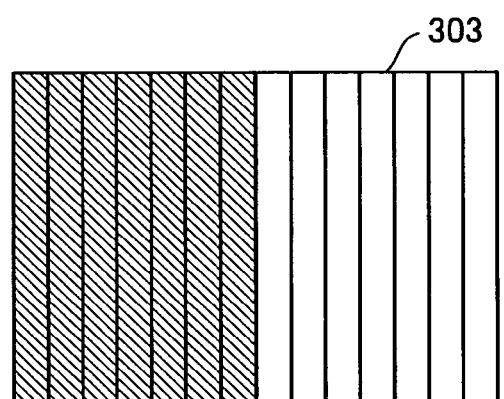
(c)

IMAGE FILE CREATING APPARATUS AND IMAGE FILE REPRODUCING APPARATUS

TECHNICAL FIELD

The present invention relates to an image file creating apparatus in which the distinction between image files for 3-dimensional display and image files for 2-dimensional display is clarified when an image file for 3-dimensional display is created as well as relating to an image file reproducing apparatus for reproducing such files.

BACKGROUND ART

Conventionally, various methods have been proposed which display 3-dimensional images. There is a method called the "lenticular system" which is one of these. One example of a recording data format to be used in this lenticular system is disclosed in Japanese Patent Application Laid-open Hei 11-41627 described below.

FIG. 13 is a conceptual diagram showing one example of a data recording format of the lenticular system. A left-eye image 301 as shown in FIG. 13(a) and a right-eye image 302 as shown in FIG. 13(b) are each thinned to half with respect to the horizontal direction, forming and recording a frame of image 303 as shown in FIG. 13(c). The thus formed image that is composed of a plurality of images is called an integrated image. When reproduced, this integrated image 303 is rearranged in a format that corresponds to an associated display to perform stereoscopic display.

Since this integrated image can be handed as an ordinary 2-dimensional image, it is possible to compress the image using a predetermined compression technique, or store it in a predetermined file format. Upon this process, if a widespread compression technique and an existing file format are used, the integrated image can be recognized as an existing format file even in a conventional reproducing device having no 3-dimensional image displaying function and can be displayed as a 2-dimensional image. As the specific examples of compression methods and file formats, JPEG, BUMP, etc., can be given for still images while, for motion pictures, MPEG-1, MPEG-2, MPEG-4, MOTION JPEG, etc., can be given as the compression method and Quick Time, Real System, Windows (R) Media Video, etc., can be given as the file format.

From a viewpoint of performing display on conventional reproducing devices, when JPEG data is to be recorded, recording of data into files conforming to the Exif (Exchangeable image file format) and DCF (Design rule for Camera File system) standard, which is an image file format standard used for digital still cameras and related systems, makes it possible for the data to be reproduced on most digital still cameras. In this DCF standard, a file conforming to the DCF standard is called a DCT file and a directory for storing the DCF file is called a DCF directory; in order to establish strong compatibility between digital still cameras, the naming rules for DCF files and DCF directories are determined as follows.

(1) The name of a file is made of "filename", "." and "extension".
(2) A filename is made of 8 characters.
(3) The first four characters of a filename can use any combination of half-width uppercase alphabetic characters, numerals and '' (underbar).
(4) The last four characters of a filename forms a number between "0001" and "9999", and is called a file number.
(5) A file containing a primary image is added with an extension ".JPG".

The naming rules for DCF directories and the directory structure are as follows.
(1) A directory name is made of 8 characters.
(2) The first three characters of a directory name forms a number between "100" and "999", and is called a directory number.
(3) The last five characters of a directory name can be any combination of half-width uppercase alphabetic characters, numerals and ''.
(4) DCF directories are formed under a directory titled as "DCIM" existing under the root directory.
(5) DCF files are stored under a DCF directory.

FIG. 14 shows an example of a directory structure conforming to the DCF standard.

When 3-dimensional image data is stored in an existing format, it is necessary to distinguish it from usual 2-dimensional image data as described above; one example of a method of distinction is disclosed in Japanese Patent Application Laid-open 2000-201308 described below.

In this disclosure, it is possible to collect special files into a particular directory by enabling the user to select the directory of the files to be recorded when images are captured by an electronic still camera.

However, even though the user recorded special files into the particular directory, it is impossible for another user to decide whether the files are of 3-dimensional image data or 2-dimensional image data.

Further, there are various information required for 3-dimensional display, such as the number of viewpoints, the method of thinning and others, it is however impossible to know in what format the recorded data was recorded, hence there occurs problem that, if a third person obtains the data, the person is not able to know how the data should be processed to display it.

The present invention has been devised to solve the above problems, it is therefore an object to provide an image file creating apparatus which enables distinction of a recorded image file between that of 2-dimensional image data and that of 3-dimensional image data as well as to providing an image file reproducing apparatus for reproducing such data.

DISCLOSURE OF INVENTION

In order to achieve the above object, an image file creating apparatus for creating an image file of a predetermined file format, from a plurality of images corresponding to a plurality of viewpoints, comprising: an information creating means for creating 3-dimensional image control information for 3-dimensional display from the plurality of viewpoint images; and a file creating means for creating an image file including the plurality of viewpoint images and the 3-dimensional image control information, is constructed so that, whether the image file is a file that includes the plurality of viewpoint images is judged based on a filename of the image file and/or a directory that stores the image file, whereby the above problems are solved.

The directory which stores the image file is made different from a directory in which image files including one-viewpoint images are stored, so as to enable making a decision on whether the image file is one that includes the plurality of viewpoint images, whereby the above problems are solved.

The filename is made to be one that indicates a fact that the file contains the plurality of viewpoint images, so as to enable making a decision on whether the image file is one that includes the plurality of viewpoint images, whereby the above problems are solved.

The filename is made to be one that is different from those based on naming rules for files made up of a one-viewpoint image, so as to enable making a decision on whether the image file is one that includes the plurality of viewpoint images, whereby the above problems are solved.

The filename is made to have an extension different from those for files made up of a one-viewpoint image, so as to enable making a decision on whether the image file is one that includes the plurality of viewpoint images, whereby the above problems are solved.

Also, an image file reproducing apparatus for reproducing a plurality of images corresponding to a plurality of viewpoint images, from an image file of a predetermined file format, comprising: an analyzing means for analyzing 3-dimensional image control information for implementing 3-dimensional display of the plurality of viewpoint images from the image file, is constructed such that the plurality of viewpoint images are reproduced in accordance with a result from the analyzing means, whereby the above problems are solved.

Further, an image file reproducing apparatus for reproducing a plurality of images corresponding to a plurality of viewpoint images, from an image file of a predetermined file format, comprising: a deciding means for deciding whether the image file is a file that includes the plurality of viewpoint images, based on a filename of the image file and/or a directory that stores the image file; and an analyzing means for analyzing 3-dimensional image control information for implementing 3-dimensional display of the plurality of viewpoint images from the image file, is constructed such that the plurality of viewpoint images are reproduced in accordance with a result from the deciding means and/or the analyzing means, whereby the above problems are solved.

According to the present invention, an image file creating apparatus for creating an image file of a predetermined file format, from a plurality of images corresponding to a plurality of viewpoints, comprises: an information creating means for creating 3-dimensional image control information for 3-dimensional display from the plurality of viewpoint images; and a file creating means for creating an image file including the plurality of viewpoint images and the 3-dimensional image control information, and is constructed so that, whether the image file is a file that includes the plurality of viewpoint images is judged based on a filename of the image file and/or a directory that stores the image file, whereby it is possible to provide an advantage of enabling a distinction between 3-dimensional image data and 2-dimensional image data.

According to the present invention, the directory which stores the image file is made different from a directory in which image files including one-viewpoint images are stored, so as to enable making a decision on whether the image file is one that includes the plurality of viewpoint images, whereby it is possible to provide an advantage of enabling a distinction between 3-dimensional image data and 2-dimensional image data.

According to the present invention, the filename is made to be one that indicates a fact that the file contains the plurality of viewpoint images, so as to enable making a decision on whether the image file is one that includes the plurality of viewpoint images, whereby it is possible to provide an advantage of enabling a distinction between 3-dimensional image data and 2-dimensional image data.

According to the present invention, the filename is made to be one that is different from those based on naming rules for files made up of a one-viewpoint image, so as to enable making a decision on whether the image file is one that includes the plurality of viewpoint images, whereby it is possible to provide an advantage of enabling a distinction between 3-dimensional image data and 2-dimensional image data.

According to the present invention, the filename is made to have an extension different from those for files made up of a one-viewpoint image, so as to enable making a decision on whether the image file is one that includes the plurality of viewpoint images, whereby it is possible to provide an advantage of enabling a distinction between 3-dimensional image data and 2-dimensional image data.

According to the present invention, an image file reproducing apparatus for reproducing a plurality of images corresponding to a plurality of viewpoint images comprises: an analyzing means for analyzing 3-dimensional image control information for implementing 3-dimensional display of the plurality of viewpoint images from the image file, and is constructed such that the plurality of viewpoint images are reproduced in accordance with a result from the analyzing means, whereby it is possible to provide an advantage of enabling a distinction between 3-dimensional image data and 2-dimensional image data.

According to the present invention, an image file reproducing apparatus for reproducing a plurality of images corresponding to a plurality of viewpoint images, from an image file of a predetermined file format, comprises: a deciding means for deciding whether the image file is a file that includes the plurality of viewpoint images, based on a filename of the image file and/or a directory that stores the image file; and an analyzing means for analyzing 3-dimensional image control information for implementing 3-dimensional display of the plurality of viewpoint images from the image file, and is constructed such that the plurality of viewpoint images are reproduced in accordance with a result from the deciding means and/or the analyzing means, whereby it is possible to provide an advantage of enabling a distinction between 3-dimensional image data and 2-dimensional image data.

BRIEF DESCRIPTION OF DRAWINGS

FIG. 13 is a conceptual diagram showing one recording data format example for the lenticular system.

BEST MODE FOR CARRYING OUT THE INVENTION

The embodied modes of the present invention will be described with reference to the drawings.

The First Embodied Mode

Figure 1:
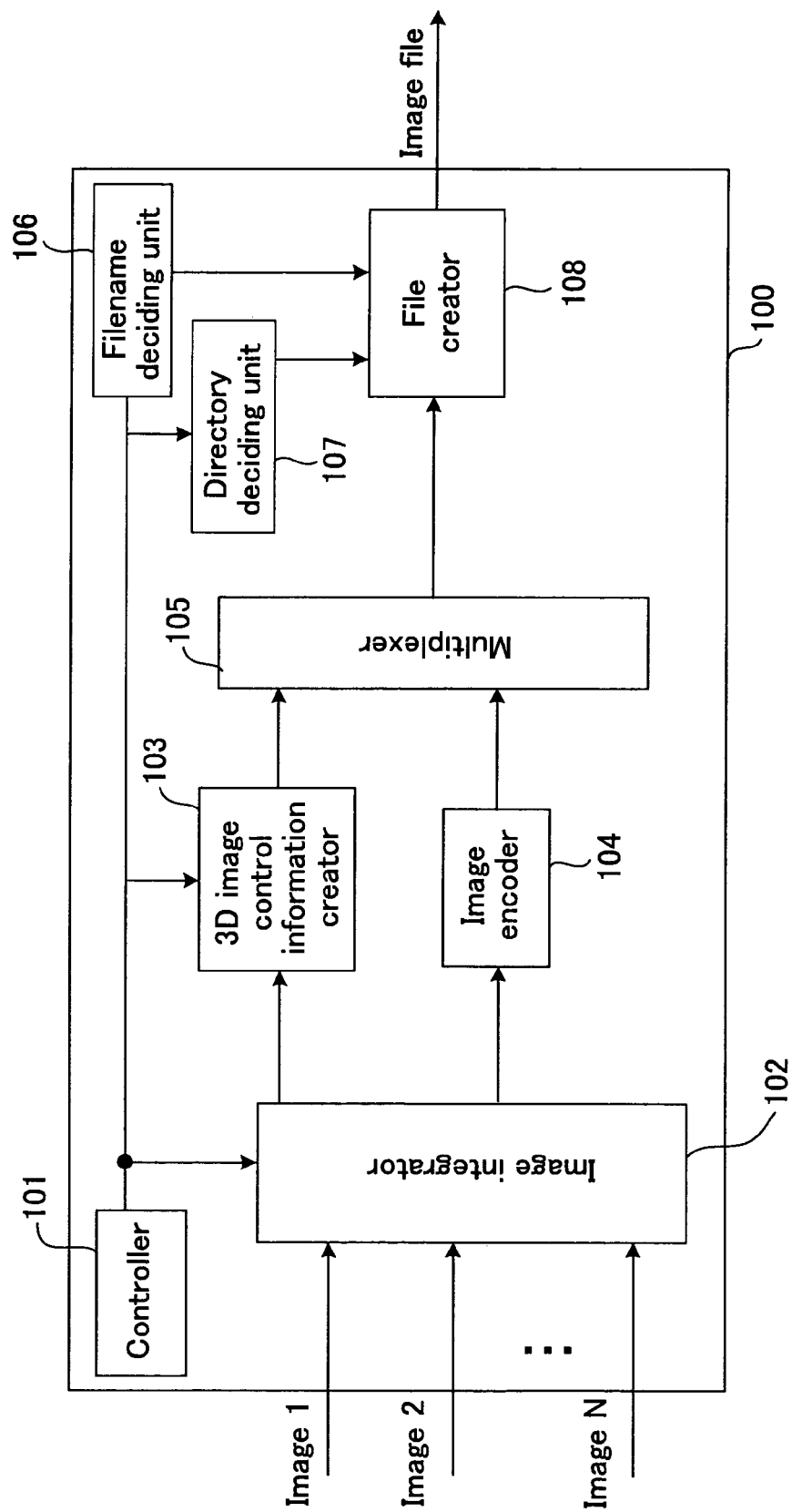
FIG. 1 is a block diagram showing a configuration of an image file creating apparatus in accordance with the first embodied mode of the present invention.

FIG. 1 is a block diagram showing a-configuration of an image file creating apparatus in accordance with the first embodied mode of the present invention. In FIG. 1, an image file creating apparatus 100 includes: a controller 101 for designating the method of integrating individual viewpoint images; an image integrator 102 for creating an integrated image by placing individual viewpoint images in appropriate positions in accordance with the instruction from controller 101; a 3D image control information creator 103 for creating 3D image control information by formatting the placement mode of individual viewpoint images and various 3-dimensional image characteristics; an encoder 104 for coding integrated image data; a multiplexer 105 for multiplexing the coded data and the 3D image control information to output them; a filename deciding unit 106 for deciding the name of a file when the multiplexed data is recorded as a file; a storage directory deciding unit 107 for deciding the directory in which a file to be recorded is stored; and a file creator 108 for recording a file with the decided filename under the decided storage directory.

Concerning the thus configured image file creating apparatus 100, its operation will be described.

An image signal composed of sequential frames is input to the image file creating apparatus, frame by frame. The input signal is not limited to binocular data for left and right-eyes but multocular data of N viewpoints may be input.

Controller 101 designates 3-dimensional image characteristics such as the image integration mode and the like.

Image integrator 102 creates integrated image data in a format designated by the method of integration. As the method of integration, integration may be done in an electrical or optical manner.

The 3-dimensional image control information creator 103 formats the information indicating the fact that the image data is of 3-dimensional image data and 3-dimensional image characteristics such as the placement mode of individual viewpoint images to create 3D image control information required for displaying an image in 3-dimensions. The items of 3D image control information may include the number of viewpoints, the placement mode of individual viewpoint images, the method of thinning, the strength of 3-dimensional image and others. The 3D image control information to be created does not need to include all these items but may include just the required items.

Encoder 104 encodes the integrated image data created by image integrator 102 to form coded data. As the coding method, international standard schemes mentioned in the prior art may be used or non-standard schemes may be used, or encoding may be implemented without compression.

Multiplexer 105 multiplexes the encoded data created by encoder 104 and the 3D image control information created by 3D image control information creator, and converts the data into a predetermined format. Though not illustrated in FIG. 1, if sound and/or text are multiplexed these data are also multiplexed at multiplexer 105. If an existing format is used as the predetermined format, it is supposed that the 3D image control information is recorded as part of an existing file header, by making use of a structure of extension of header content, which is usually defined in typical existing formats. For example, in a case of the DCF standard, the application maker segment defined in JPEG may be extended so as to multiplex the 3D image control information, the tag provided in Exif may be extended to define a tag for 3D image control information so as to multiplex the 3D-image control information, or other methods can be used.

Filename deciding unit 106 decides the name of a file when multiplexed data is recorded as a file. Upon naming, the name of a file is determined so as to explicitly show that the file contains 3-dimensional image data. Now, examples of recording a file of 3-dimensional image data based on the DCF standard or by extending the DCF standard will be described.

Figure 2:
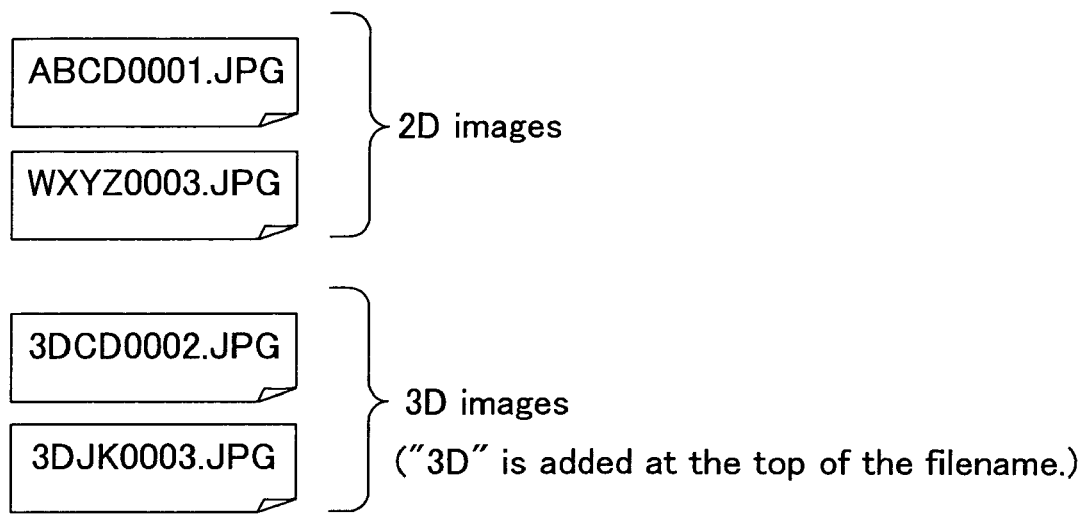
FIG. 2 is one filename example based on the DCF standard, for explicitly showing that a file contains 3-dimensional image data.

FIG. 2 is one filename example for explicitly showing that a file contains 3-dimensional image data, based on the DCF standard. In a case of the DCF standard, the first four characters of a filename can use any combination of half-width uppercase alphabetic characters, numerals and '' (underbar), as described in the prior art. Hence, it is possible to explicitly show the subject file to be of 3-dimensional image data by adding, for example "3D" at the top of the filename. It is also possible to set a rule that a file of 3-dimensional image data should have a file name having a '' (underbar) as the fourth character.

Nevertheless, since some 2-dimensional image data files could have "3D" at the top of the filename thereof or a '' (underbar) as the fourth character, such a filename does not always represent a file of 3-dimensional image data. However, it is still possible to offer the user the information that the subject file may contain 3-dimensional image data.

Herein, characters such as "3D" and '' (underbar) are used to indicate a file of 3-dimensional image data, the characters are not limited to these with 2 characters or 1 character or with their position at the front or the fourth place. It is also possible to indicate the entity of a file of 3-dimensional image data by the last part of the filename corresponding to the file number.

Figure 3:
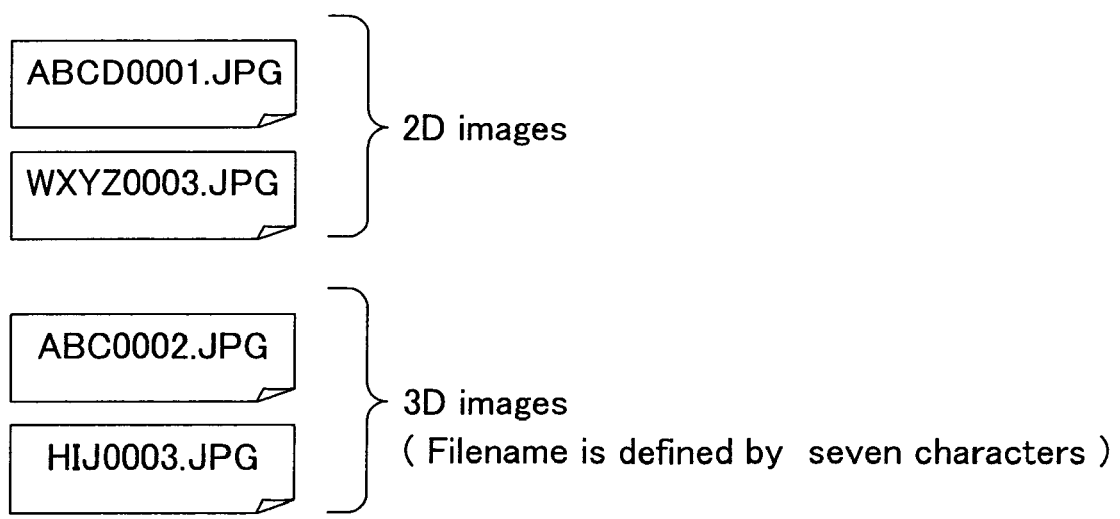
FIG. 3 is one filename example for explicitly showing that a file contains 3-dimensional image data, by extending the DCF standard.

FIG. 3 shows a filename example, explicitly showing that a file contains 3-dimensional image data, by extending the DCF standard. In the examples heretofore, filenames conforming to the file naming rules of the DCF standard were used; there are also cases in which filenames that do not conform to the file naming rules of the DCF standard are used on purpose. For example, a filename may be defined with seven characters, as shown in FIG. 3. It is also possible to define a filename so that it starts with "@", which is not a character that can be used for a DCF filename. In this way, use of a filename that does not conform to the DCF standard makes it possible for existing reproducing apparatuses which conform to the DCF standard to recognize that the subject file is a JPEG file that does not conform to the DCF standard.

Figure 4:
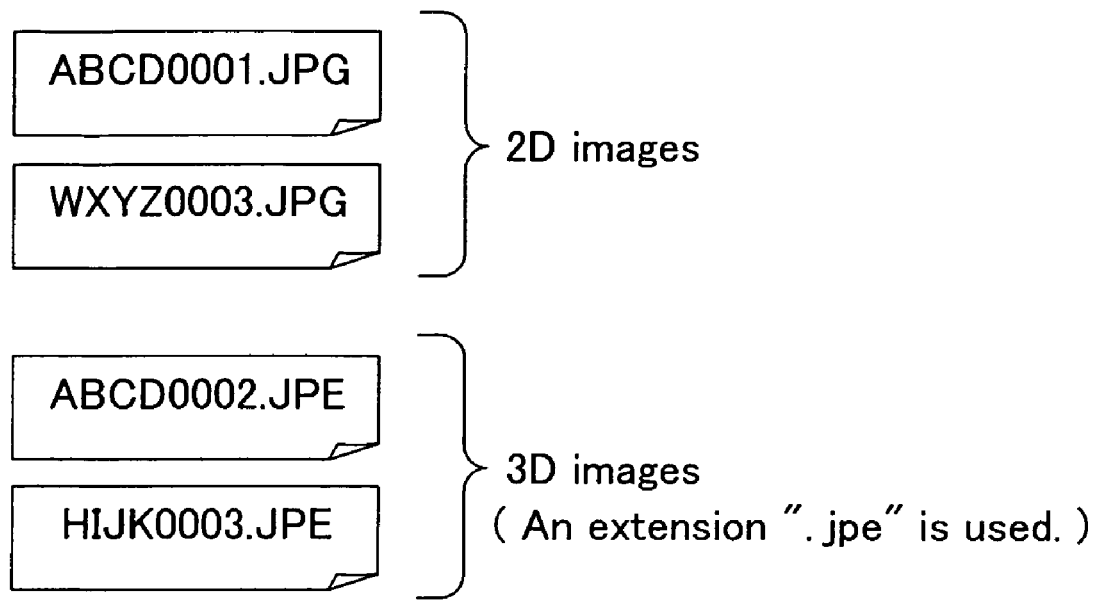
FIG. 4 is one filename example for explicitly showing that a files contains 3-dimensional image data, by extending the DCF standard.

FIG. 4 is another filename example, explicitly showing that a file contains 3-dimensional image data, by extending the DCF standard. As shown in the example of FIG. 4, it is possible to show the entity of a 3-dimensional image data file with a file extension. For example, instead of the extension ".JPG", ".JPE" or ".JPEG" may be used. Files with these extensions are not recognized as DCF files, but can be recognized in most cases as JPEG files in PCs and other systems. Therefore, such a file is reproduced as 2-dimensional image data by JPEG reproduction software on PCs. Further, instead of ".JPE" or ".JPEG", a totally new extension can be introduced. Though introduction of a totally new extension disables the reproduction of the file by existing JPEG reproduction software, it is possible to avoid a risk of the aforementioned 3D image control information being edited or destructed by an existing JPEG editing tool and becoming unable to be reproduced as 3-dimensional image data.

Storage directory deciding unit 107 determines the directory under which the file to be recorded is stored. Upon this, inclusion of a 3-dimensional image data file is adapted to be shown explicitly by the directory to store the file. This case is also described by taking an example in which a file of 3-dimensional image data is recorded based on DCF standard or by extending the DCF standard as in the case of the description of the filename deciding unit.

Figure 5:
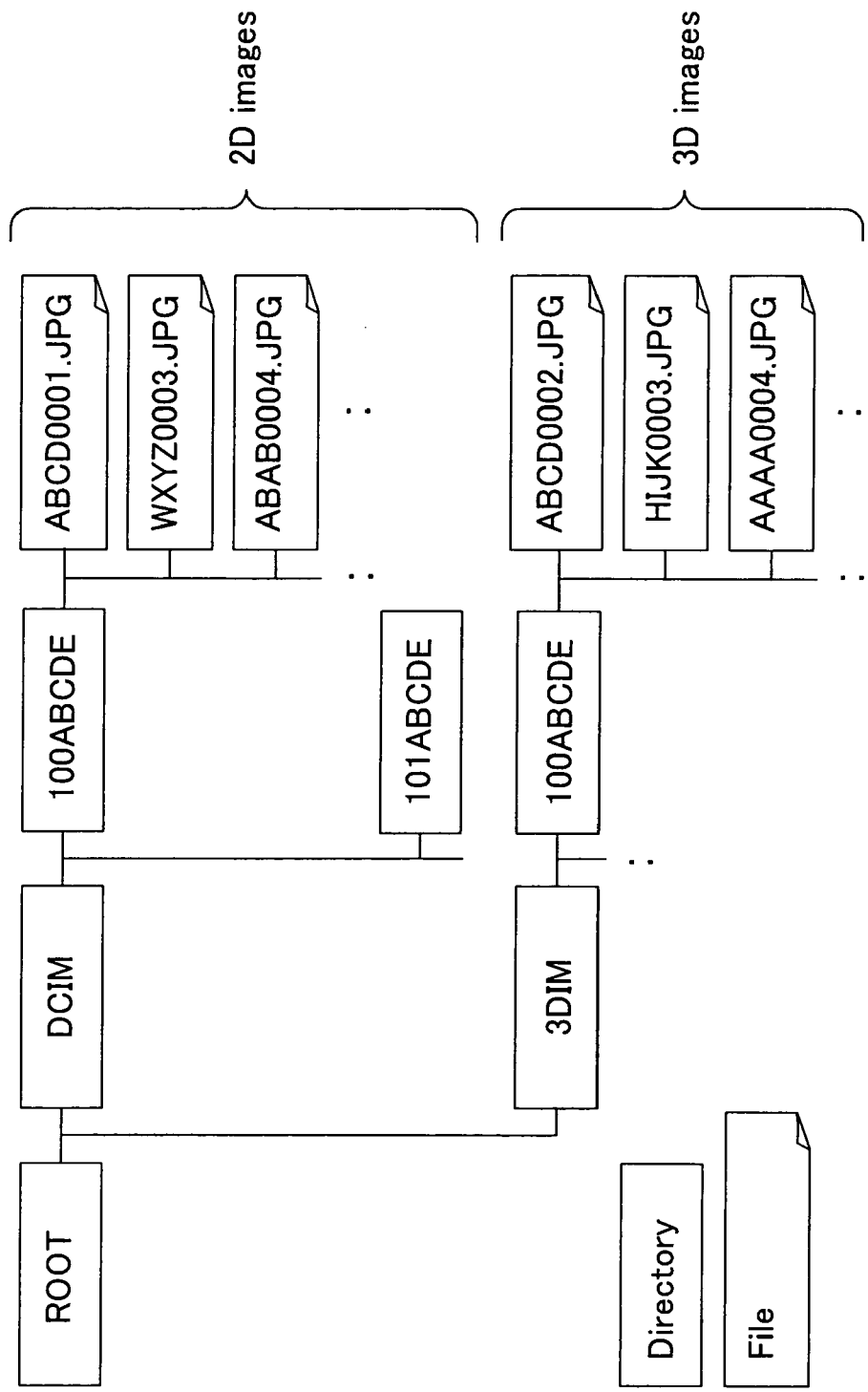
FIG. 5 is one directory structure example when 3-dimensional image data is stored by extending the DCF standard.

FIG. 5 shows one example of a directory structure when 3-dimensional image data is stored by extending the DCF standard. As described in the prior art, according to the rules of the DCF standard, a directory titled as "DCIM" is created immediately under the root directory, DCF directories are created under the "DCIM", and DCF files are stored under the DCF directory. In this structure, for example, a directory named "3DIM" is created immediately under the root directory, so that files of 3-dimensional image data can be stored under this directory. Accordingly, 2-dimensional image data is stored under "DCIM" while 3-dimensional image data is stored under "3DIM", so that it is possible to provide distinction between 2-dimensional image data and 3-dimensional image data. Here, the directory name "3DIM" is used as an example, other names can be used as long as they can be made different from the existing "DCIM" directory. In FIG. 5, a directory named "100ABCDE" in conformity with the directory naming rules of the DCF standard is created under "3DIM" and 3-dimensional image data files are stored under this. However, 3-dimensional image data files may be stored directly under the "3DIM" directory or maybe stored under a directory residing in a lower layer. In addition, the directories under "3DIM" may be either ones conforming to the naming rules of the DCF standard or ones not.

Figure 6:
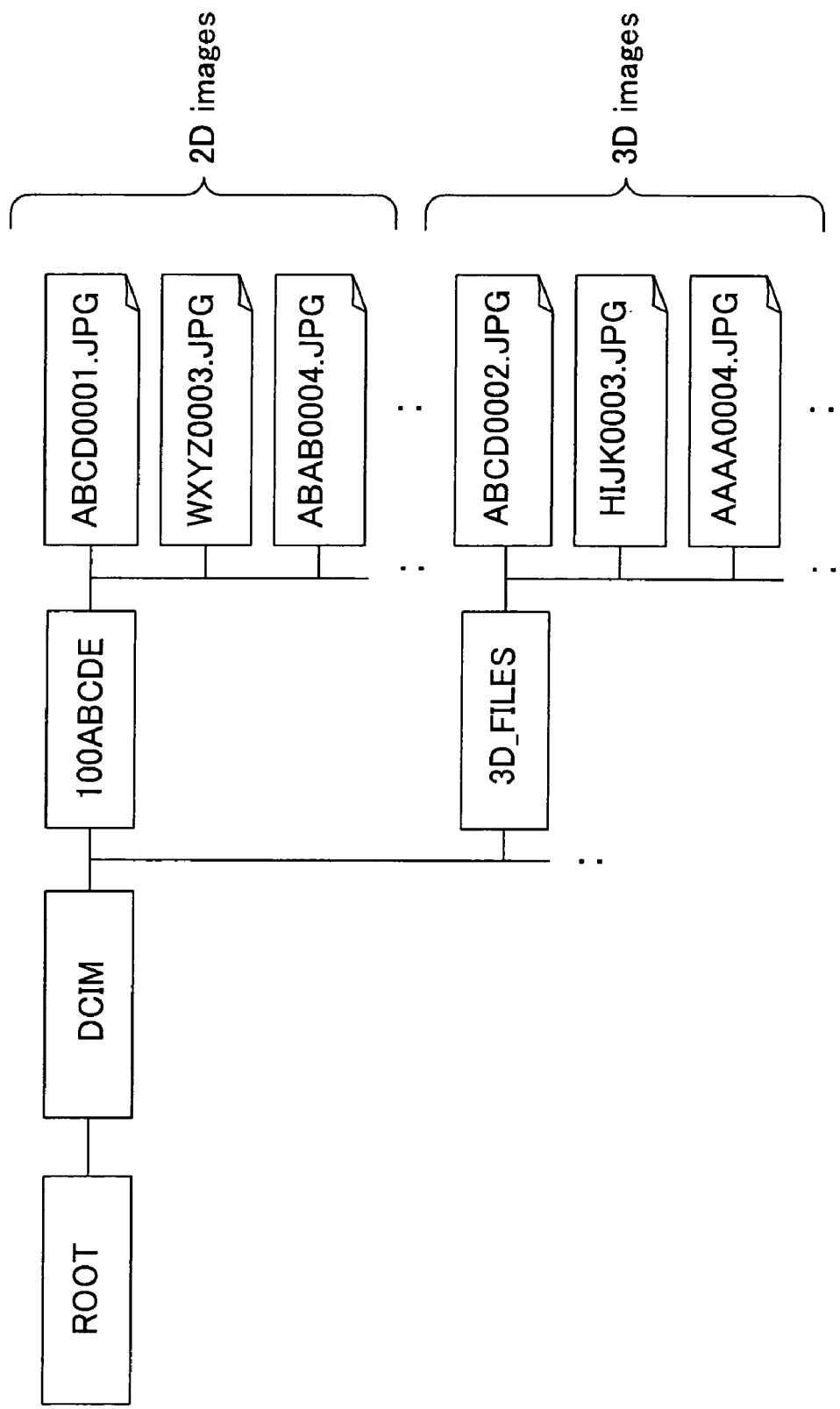
FIG. 6 is one directory structure example when 3-dimensional image data is stored by extending the DCF standard.

FIG. 6 shows another example of a directory structure when 3-dimensional image data is stored by extending the DCF standard. In this example, a directory having a name of "3D_FILES", which is out of the directory naming rules of the DCF standard, is created immediately under "DCIM", and 3-dimensional image data files are adapted to be stored under that directory. This makes possible distinction between 2-dimensional image data and 3-dimensional image data. Here, the directory name "3D_FILES" is used as an example, but other names can be used as long as they have a name not conforming to the DCF directory naming rules.

Figure 7:
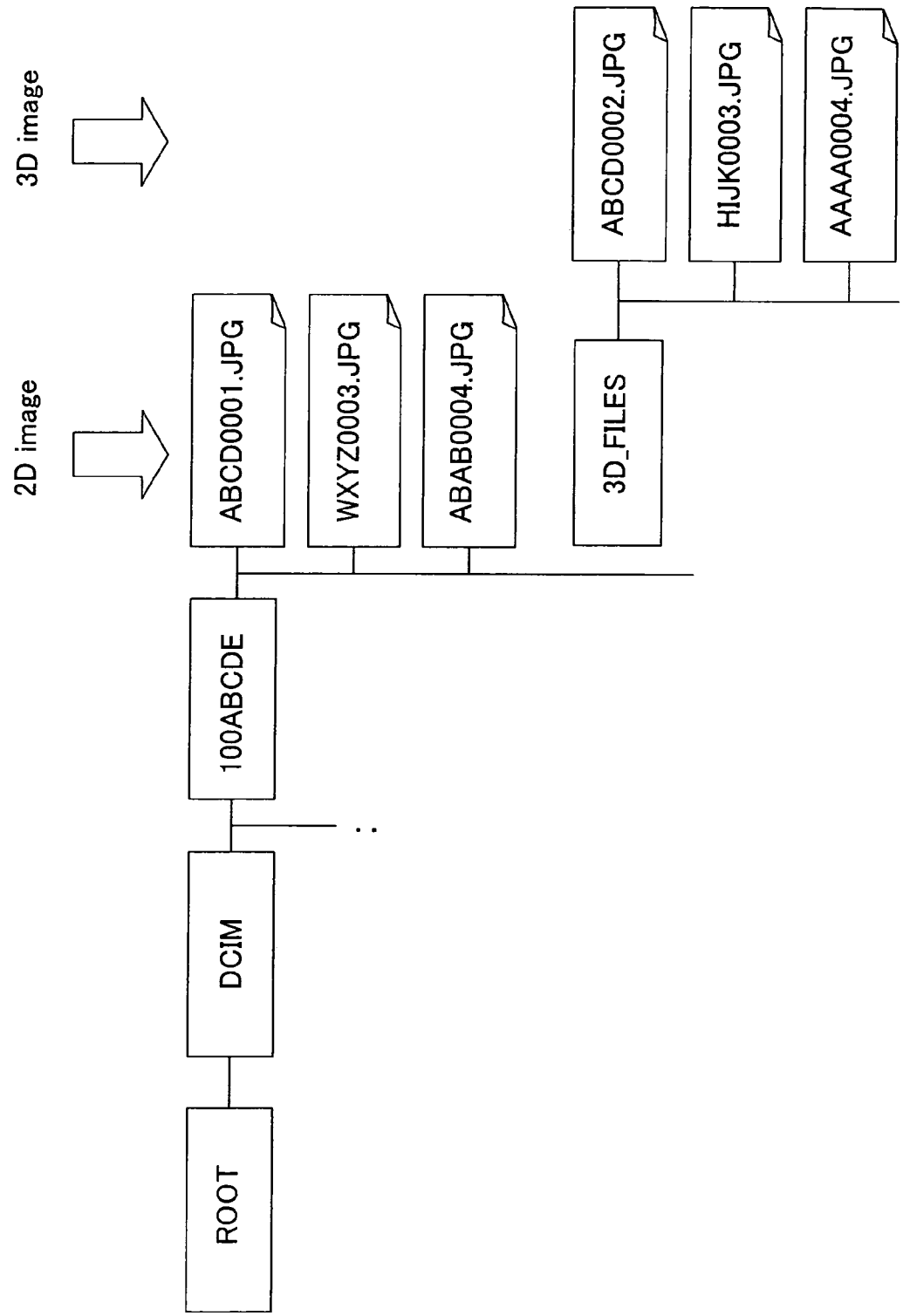
FIG. 7 is one directory structure example when 3-dimensional image data is stored by extending the DCF standard.

FIG. 7 shows another example of a directory structure when 3-dimensional image data is stored by extending the DCF standard. In this example, a directory having a name of "3D_FILES" is created under the DCF directory ("100AB-CDE") that is immediately under "DCIM", and 3-dimensional image data files are stored under that directory. This makes possible distinction between 2-dimensional image data and 3-dimensional image data. Here, the directory name "3D_FILES" is used as an example, but the name is not limited to this.

File creator 108 records a file into a recording medium or the like, in accordance with the filename determined by filename deciding unit 106 and the storage directory determined by storage directory deciding unit 107. The output from file creator 108 is connected to a recording device such as a IC memory, magneto-optical disk, magnetic tape, hard disk or the like, or a communications device such as LAN, modem or the like.

Here, both the filename deciding unit 106 and storage directory deciding unit 107 determine the filenames and storage directories for demonstrating the entities of 3-dimensional image data. However, explicit indication of the entity of 3-dimensional image data may be given by either or both of the two units. In addition, the description heretofore has been made taking examples of the cases based on DCF standard, but other standards and criteria may be used.

It is also possible to set up the attributes of a 3-dimensional image data file or the directory under which the file is stored, in a read-only file or hidden file, so that the 3D image control information will not be destructed by an existing JPEG editing tool or the like. Further, these setups may be adapted to be changeable in accordance with the designation at recording or user instructions.

Next, description will be made of a reproducing apparatus which displays the image data created by image file creating apparatus 100, as a 3-dimensional image.

Figure 8:
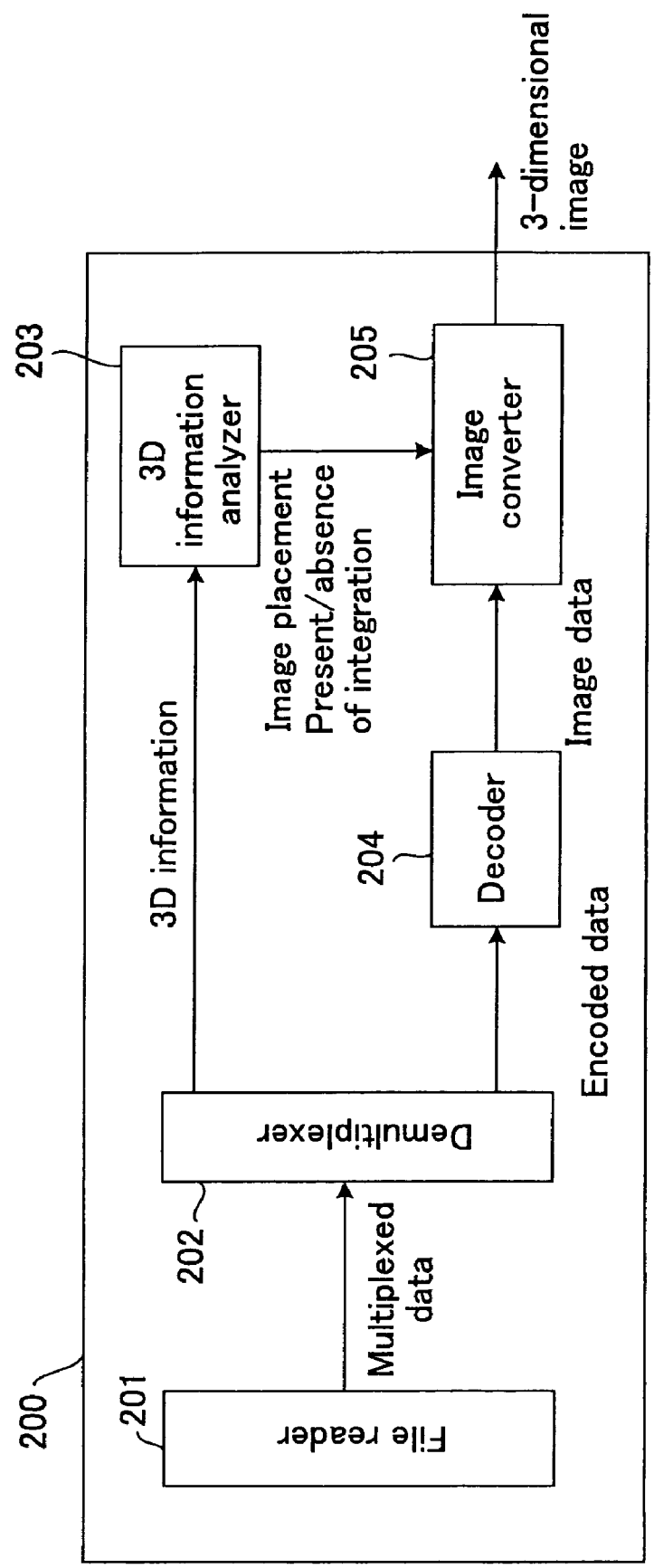
FIG. 8 is a block diagram showing a configuration of an image file reproducing apparatus according to the first embodied mode of the present invention.

FIG. 8 is a block diagram showing a configuration of an image file reproducing apparatus according to the first embodied mode of the present invention. In FIG. 8, an image file reproducing apparatus 200 comprises: a file reader 201 for reading out a file; a demultiplexer 202 for separating multiplexed data; a 3D image control information analyzer 203 for analyzing 3D image control information; a decoder 204 for decoding coded data; and an image converter 205 for converting image data into a display format.

Concerning the thus configured image file reproducing apparatus 200, its operation will be described.

File reader 201 reads out a file to be reproduced, from a recording device or a communications device, extracts multiplexed data, and analyzes the filename and storage directory.

Demultiplexer 202 separates the multiplexed data extracted by the file reader into coded data and 3D image control information. Though not shown in FIG. 8, when sound and/or text have been multiplexed, these data are also separated through demultiplexer 202.

The 3-dimensional image control information analyzer 203 analyzes the 3D image control information and extracts the 3-dimensional image characteristics such as the number of viewpoints, the placement mode of individual viewpoint images and others.

Decoder 204 decodes image data from the coded data that has been separated by demultiplexer 202.

Connected to image converter 205 may be various types of display devices having different display formats, such as 2-dimensional display devices using ordinary CRTs or liquid crystal panels, stereoscopic display devices using lenticular system, parallax barrier system, alternating-field system, etc. Image converter 205, based on the number of viewpoints and the placement mode of individual viewpoint images, converts the decoded image data into a display format.

Now, the operations of reproducing machines for reproducing a file having the directory structure described in FIG. 5 will be described. In the directory structure as shown in FIG. 5, 2-dimensional image data is stored under "DCIM" while 3-dimensional image data is stored under "3DIM", hence it is possible to distinguish between 2-dimensional image data and 3-dimensional image data. Accordingly, a device having the display function of 3-dimensional images distinguishes between 2-dimensional image data and 3-dimensional image data and implements respective reproduction, correspondingly. On the other hand, a device that can handle 2-dimensional image data only, may just reproduce the image files under "DCIM". Further, a device that does not have a display function of 3-dimensional images but can interpret 3-dimensional images, may convert the image files under "3DIM" into 2-dimensional image data forms and reproduce them.

In connection with the above, there could be cases in which a file including 3-dimensional image data resides under "DCIM", or a file including 2-dimensional image data resides under "3DIM ". As countermeasures against such cases, the content of each file may be analyzed by checking the presence or absence of 3D image control information, so as to make distinction between 2-dimensional image data and 3-dimensional image data.

Concerning files that reside under "3DIM" but have no 3D image control information and files that reside under "DCIM" but have 3D image control information, these files may be judged as error files. Alternatively, these files may be handled by giving priority to either the directory under which the file is stored or the presence or absence of 3D image control information.

Thus, the above configuration makes it possible to not only make distinction between files of 3-dimensional image data and files of 2-dimensional image data, but also make the recorded 3-dimensional image data versatile and have the same 3-dimensional image data shared by different 3-dimensional display systems.

The Second Embodied Mode

Figure 9:
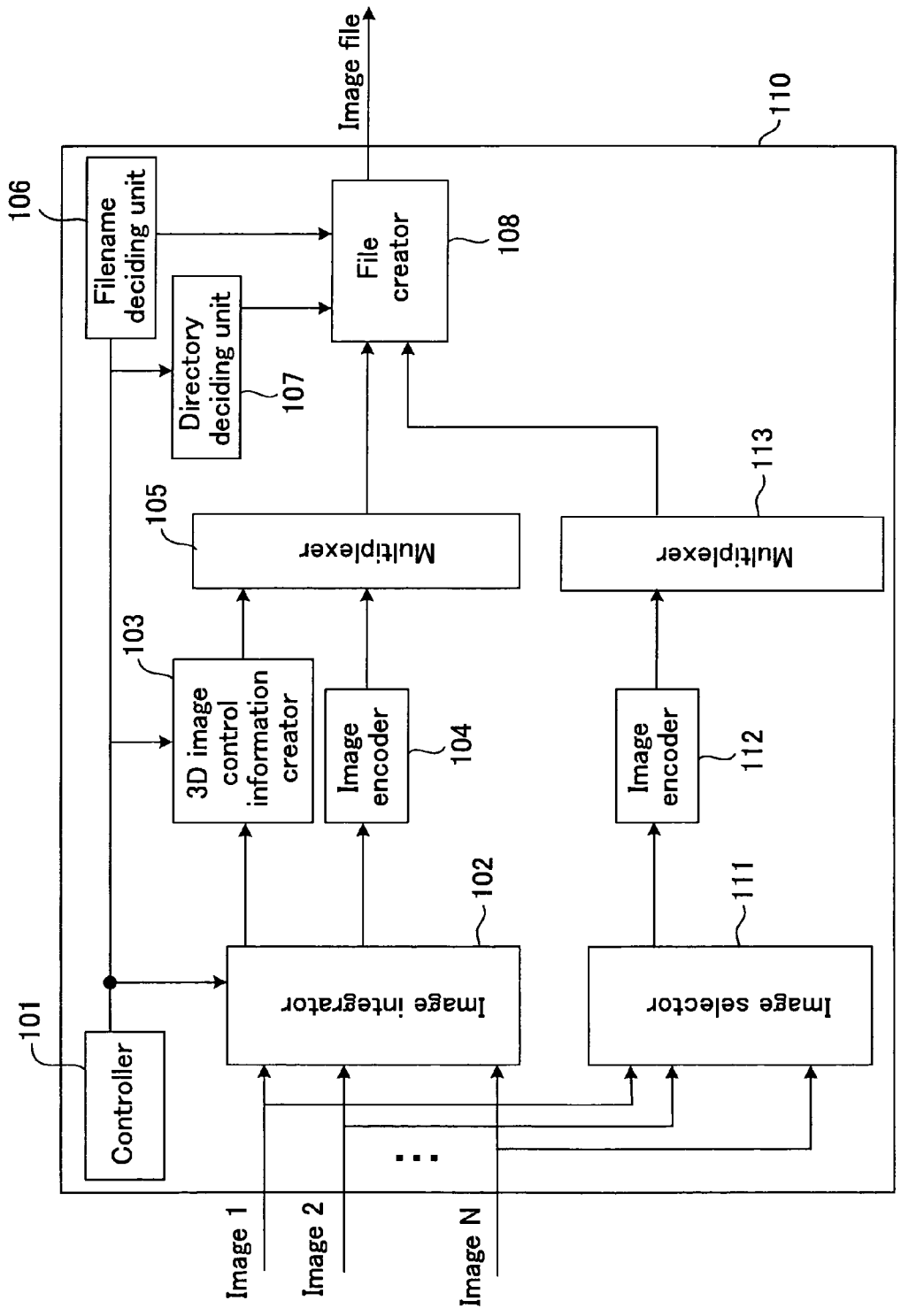
FIG. 9 is a block diagram showing a configuration of an image file creating apparatus according to the second embodied mode of the present invention.

FIG. 9 is a block diagram showing a configuration of an image file creating apparatus according to the second embodied mode of the present invention. In FIG. 9, the same components as those in FIG. 1 are allotted with the same reference numerals. In FIG. 9, an image file creating apparatus 110 comprises: a controller 101; an image integrator 102; a 3D image control information creator 103; an encoder 104; a multiplexer 105; a filename deciding unit 106; a storage directory deciding unit 107; a file creator 108; an image selector 111 for selecting a one-viewpoint image from a plurality of viewpoint images; an encoder 112 for coding the image data of the selected viewpoint image; and a multiplexer 113 for multiplexing the coded data and various information and outputting them.

Concerning the thus configured image file creating apparatus 110, its operation will be described. Controller 101, image integrator 102, 3D image control information creator 103, encoder 104, multiplexer 105, filename deciding unit 106, storage director deciding unit 107 and file creator 108 operate in the same manner as those in the first embodied mode, so that the description is omitted.

Encoder 112 encodes the data of the viewpoint image selected by image selector 111 and creates its encoded data. As to the coding method, the international standard schemes cited in the prior art may be used or non-standard schemes may be used. Also, encoding may be implemented without compression. Since encoder 104 provides the same function, only one encoder may be provided so that one encoder can serve both functions.

Multiplexer 113 converts the coded data created by encoder 112 into a predetermined format. Though not shown in FIG. 9, when sound and/or text are to be multiplexed, these data are also multiplexed at multiplexer 113. Since multiplexer 105 provides the same function, only one multiplexer may be provided so that one multiplexer can serve both functions.

Figure 10:
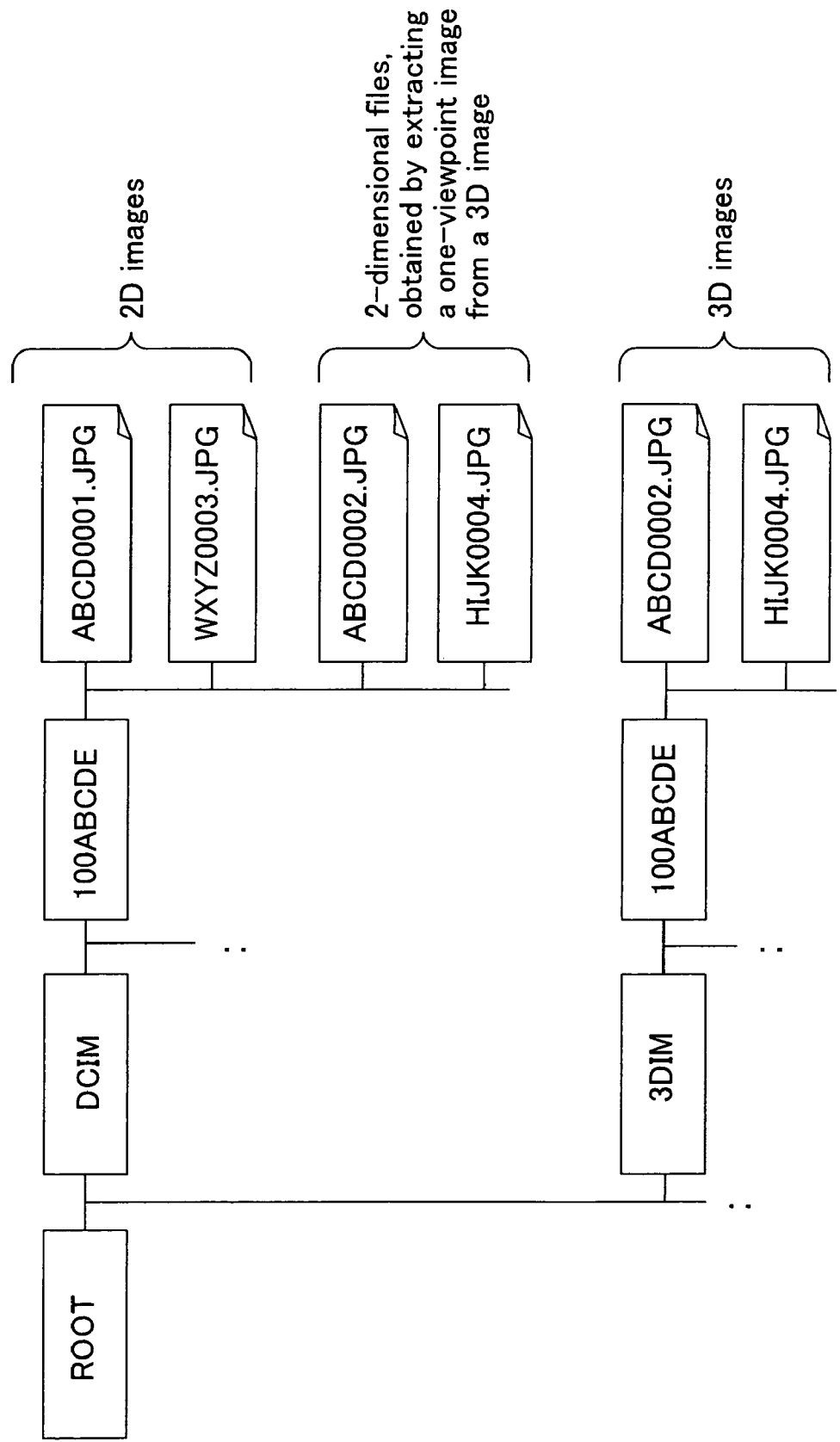
FIG. 10 is one directory structure example when 3-dimensional image data is stored by extending the DCF standard.

FIG. 10 shows one directory structure example when 3-dimensional image data is stored by extending the DCF standard in the second embodied mode. This is an applied example from one of the directory structure examples described in the first embodied mode, specifically the example in which a directory named "3DIM" is created immediately under the root directory, and files of 3-dimensional image data are stored under that directory. In the case of this directory structure, a device that can only handle 2-dimensional image data cannot recognize the existence of files of 3-dimensional image data because it will only reproduce the image files under "DCIM". To deal with this situation, when a file of 3-dimensional image data (ABCD002.JPG) is recorded in the storage location of 3-dimensional image data (under the directory "100ABCDE" immediately under "3DIM"), image data for 2-dimensional display, which is created from the one-viewpoint image selected from a plurality of viewpoint images, is stored as a file having the same filename in the storage location of 2-dimensional image data (under the directory "100ABCDE" immediately under "DCIM"). This makes it possible for even a device that can only reproduce file under "DCIM" to recognize the storage of the captured image. In the above case, the same filename is used for both the file of 3-dimensional image data and the file of 2-dimensional image data, but different filenames maybe used. In addition, information as to the correlation between the two files may be multiplexed on both files or only one of them.

Figure 11:
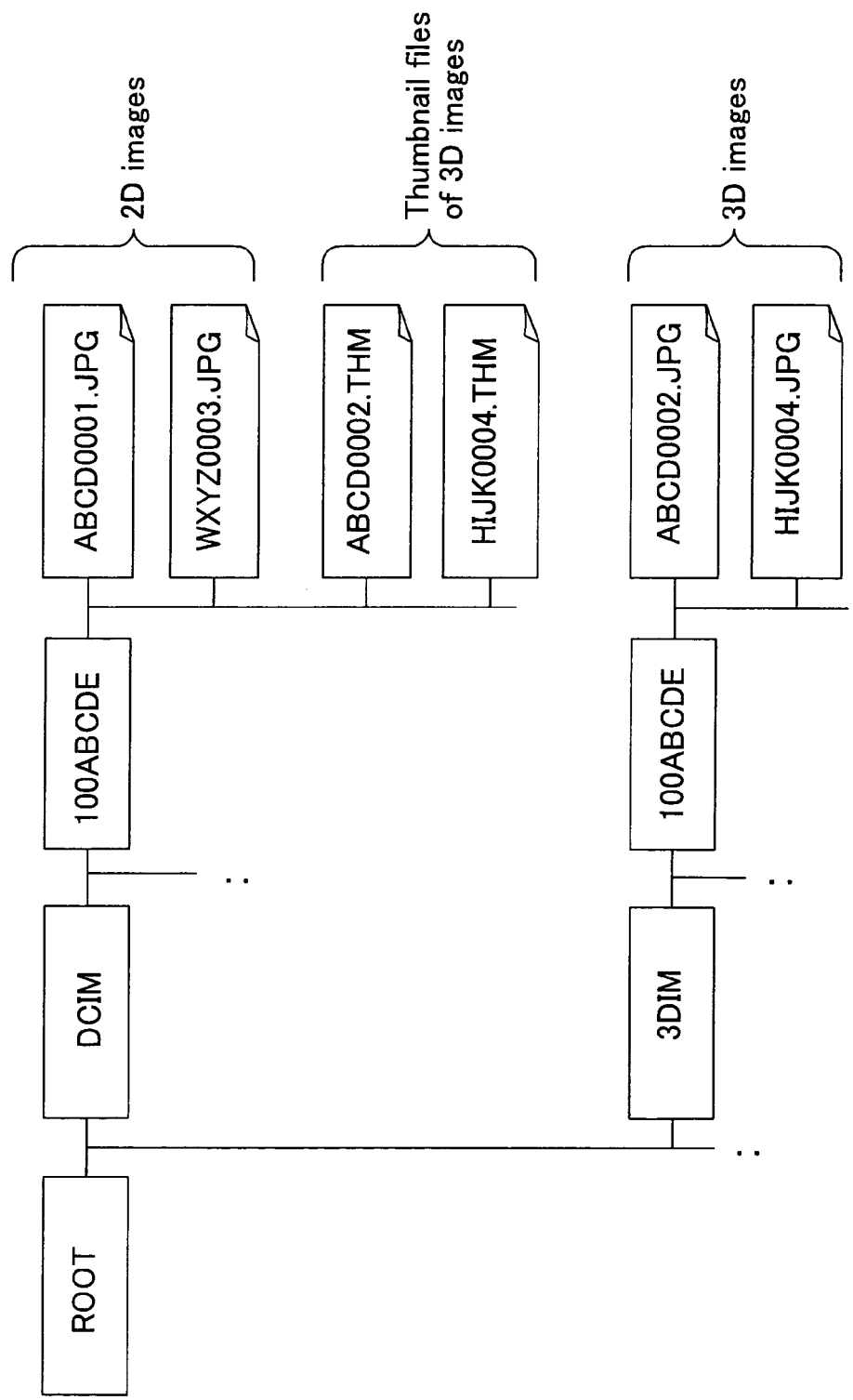
FIG. 11 is one directory structure example when 3-dimensional image data is stored by extending the DCF standard.
Figure 12:
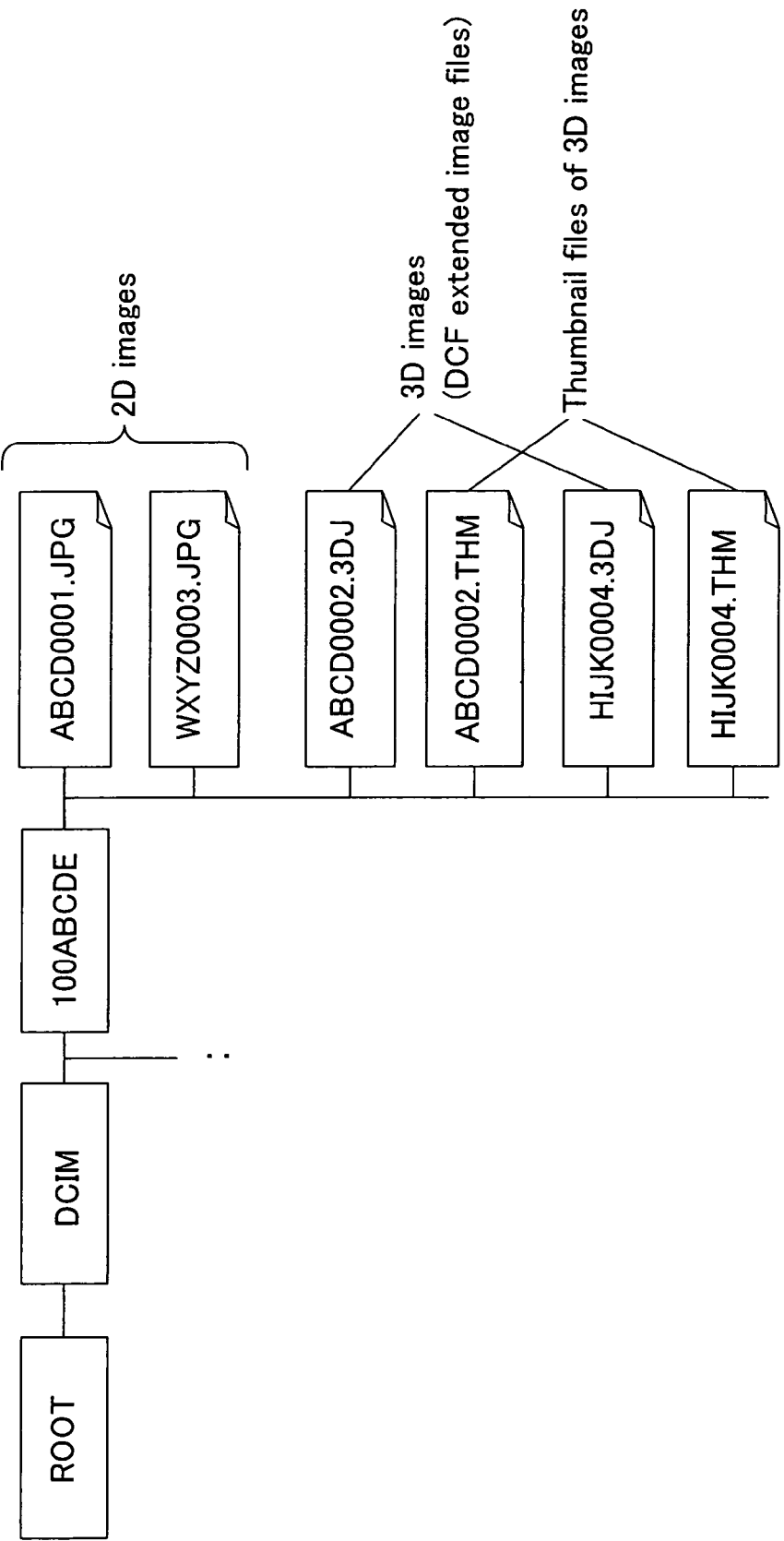
FIG. 12 is one directory structure example when 3-dimensional image data is stored by extending the DCF standard.
Figure 14:
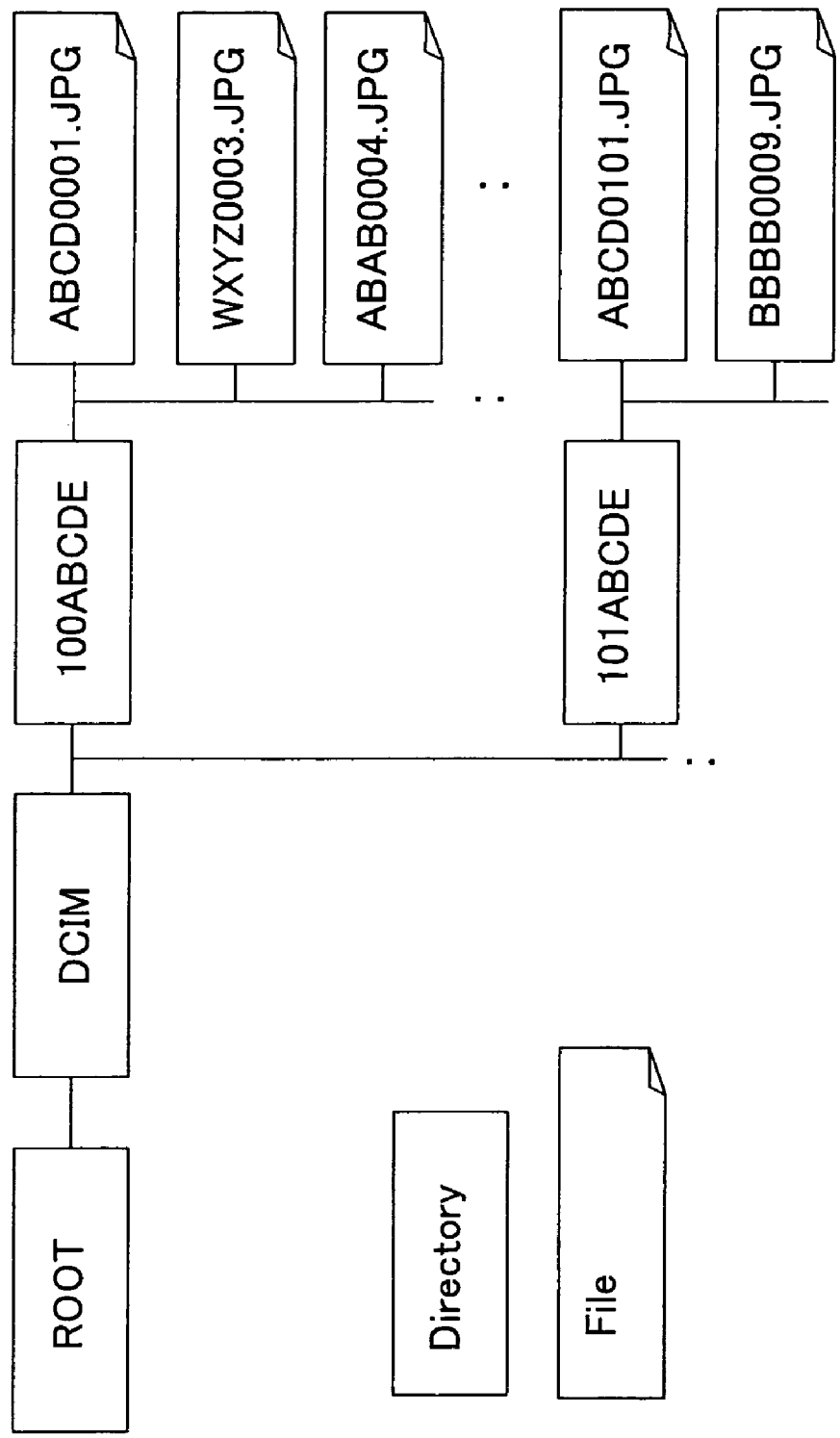
FIG. 14 is an example of a directory structure conforming to the DCF standard.

The files of 2-dimensional image data may use thumbnail images instead of primary images, as shown in FIG. 11. If thumbnail images are used, the file extension should be ".THM" instead of ".JPG".

If a different file extension other than ".JPG" is used for a file of 3-dimensional image data, files of 3-dimensional image data may be recorded in the storage location of 2-dimensional image data (under the directory "100ABCDE" immediately under "DCIM").

INDUSTRIAL APPLICABILITY

The present invention is suitable for an image file creating apparatus and image file reproducing apparatus in which the distinction between 3-dimensional image data and 2-dimensional image data is clarified by determining whether an image file is one that includes images viewed from a plurality of viewpoints, based on the filename of the image file and/or based on the directory under which the file is stored.

The invention claimed is:

1. An image file creating apparatus for creating a 3-dimensional image file from a plurality of images corresponding to a plurality of viewpoints onto a recording medium by using a 2-dimensional image file format, and for enabling the image file to be judged by an image file reproducing apparatus as to whether the image file is a 3-dimensional image file and to be reproduced in the image file reproducing apparatus, comprising:

an image integrating unit that integrates a plurality of viewpoint images into one image by placing them at predetermined positions;

an image selector that selects one viewpoint image from the plurality of viewpoint images and creates a 2-dimensional image file from the selected one viewpoint image;

an information creating unit that creates 3-dimensional image control information by formatting a 3-dimensional image characteristic including the placement of individual viewpoint images in the integrated image;

an deciding unit that decides a filename of an image file and a directory under which the image file are stored; and a file creating unit that formats a 3-dimensional image file including the integrated image and the 3-dimensional image control information, and the 2-dimensional image file; and that records those image files into a recording medium in accordance with a decision result of the deciding unit, wherein the deciding unit decides the filename and the directory in such a manner that if a 2-dimensional image file and a 3-dimensional image file are created based on the same plurality of viewpoint images, then the 2-dimensional image file and 3-dimensional image file have the same filename and different extensions, and the 2-dimensional image file and 3-dimensional image file created in the file creating means are stored in a common directory together, or one of the 2-dimensional image file and 3-dimensional image file created in the file creating means is stored in one directory and the other image file is stored in another directory that is under said one directory, and if the 3-dimensional image file is created and stored in a 3-dimensional image directory, then the 2-dimensional image file is created from one viewpoint image selected from the plurality of viewpoint images for creating the 3-dimensional image file, and is stored in a 2-dimensional image directory.

2. The image file creating apparatus according to claim 1, wherein the deciding unit decides the extension of the 3-dimensional image file in such a manner that the extension of the 3-dimensional image file is made to be one that is different from those based on extension naming rules based on image file format standards for files made up of the one-viewpoint image, and in an apparatus which can not handle the 3-dimensional image file, the extension is not recognized as one for files which can be handled.

* * * * *